(12) United States Patent
Westbrook et al.

(10) Patent No.: US 10,984,057 B2
(45) Date of Patent: Apr. 20, 2021

(54) METHOD AND APPARATUS FOR SEARCH QUERY FORMULATION

(71) Applicant: INTERDIGITAL MADISON PATENT HOLDINGS, SAS, Paris (FR)

(72) Inventors: Shaun Westbrook, West Hollywood, CA (US); Juan M Noguerol, Gardena, CA (US)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 546 days.

(21) Appl. No.: 15/513,575

(22) PCT Filed: Sep. 22, 2015

(86) PCT No.: PCT/US2015/051421
§ 371 (c)(1),
(2) Date: Mar. 23, 2017

(87) PCT Pub. No.: WO2016/049009
PCT Pub. Date: Mar. 31, 2016

(65) Prior Publication Data
US 2017/0300581 A1 Oct. 19, 2017

Related U.S. Application Data

(60) Provisional application No. 62/053,838, filed on Sep. 23, 2014.

(51) Int. Cl.
*G06F 16/00* (2019.01)
*G06F 16/9535* (2019.01)
(Continued)

(52) U.S. Cl.
CPC ...... *G06F 16/9535* (2019.01); *G06F 3/04886* (2013.01); *G06F 16/2428* (2019.01);
(Continued)

(58) Field of Classification Search
CPC ............. G06F 16/9535; G06F 16/2428; G06F 3/04886; G06F 3/04817; G06F 3/0482; G06F 3/04845; G06F 3/0488
(Continued)

(56) References Cited

U.S. PATENT DOCUMENTS 6,448,987 B1 * 9/2002 Easty .................... G06F 3/0482
715/834
6,463,428 B1 10/2002 Lee et al.
(Continued)

FOREIGN PATENT DOCUMENTS

CN 1926546 A 3/2007
JP 2003529157 A 9/2003
(Continued)

*Primary Examiner* — Thanh-Ha Dang
(74) *Attorney, Agent, or Firm* — Lily Neff

(57) ABSTRACT

Systems, methods, and user interfaces for search query formulation are provided. A graphical representation (610) of a media basis may be provided that includes at least one metadata region (611) representing metadata associated with the media basis. Then, at least one user selection (620) of at least a portion of the graphical representation (610) may be received. Based on the received selection(s) (620), at least one search term may be generated.

19 Claims, 7 Drawing Sheets

(51) Int. Cl.
  *G06F 3/0488* (2013.01)
  *G06F 16/242* (2019.01)
  *G06F 3/0481* (2013.01)
  *G06F 3/0482* (2013.01)
  *G06F 3/0484* (2013.01)

(52) U.S. Cl.
  CPC .......... *G06F 3/0482* (2013.01); *G06F 3/0488* (2013.01); *G06F 3/04817* (2013.01); *G06F 3/04845* (2013.01)

(58) Field of Classification Search
  USPC ........................................................ 707/706
  See application file for complete search history.

(56) References Cited

U.S. PATENT DOCUMENTS

| | | | |
|---|---|---|---|
| 6,714,929 B1 | 3/2004 | Micaelian et al. | |
| 7,849,096 B2* | 12/2010 | Fein | G06F 16/2425 707/765 |
| 7,992,102 B1* | 8/2011 | De Angelo | G06F 3/04886 715/834 |
| 8,176,440 B2* | 5/2012 | Stading | G06F 16/34 715/853 |
| 8,229,873 B1* | 7/2012 | Dolan | G06N 20/00 706/45 |
| 8,463,774 B1* | 6/2013 | Buron | G06F 16/95 707/724 |
| 9,519,398 B2* | 12/2016 | Wang | G06F 3/04883 |
| 9,710,471 B2* | 7/2017 | Yang | G06F 16/48 |
| 10,223,438 B1* | 3/2019 | Xu | G06F 16/285 |
| 10,331,301 B2* | 6/2019 | Roy | G06F 3/0362 |
| 2004/0215612 A1 | 10/2004 | Brody et al. | |
| 2008/0005091 A1 | 1/2008 | Lawler et al. | |
| 2008/0065622 A1 | 3/2008 | Goto et al. | |
| 2008/0126303 A1* | 5/2008 | Park | G06F 16/78 |
| 2008/0228717 A1 | 9/2008 | Fein | |
| 2009/0132441 A1* | 5/2009 | Muller | H04N 21/85403 706/11 |
| 2009/0259621 A1* | 10/2009 | Svendsen | G06Q 30/02 |
| 2011/0047014 A1* | 2/2011 | De Angelo | G06F 3/04847 705/14.4 |
| 2011/0196864 A1* | 8/2011 | Mason | G06F 16/438 707/728 |
| 2012/0079430 A1 | 3/2012 | Kwahk et al. | |
| 2013/0081084 A1* | 3/2013 | Scheer | H04N 21/252 725/46 |
| 2013/0117260 A1* | 5/2013 | Barrett | G06F 16/444 707/722 |
| 2013/0259446 A1 | 10/2013 | Sathish | |
| 2013/0339904 A1* | 12/2013 | Geithner | G06F 3/0488 715/834 |
| 2014/0053210 A1 | 2/2014 | Cheong et al. | |
| 2014/0188844 A1* | 7/2014 | Kogan | G06F 16/58 707/722 |
| 2015/0178323 A1 | 1/2015 | Endou et al. | |
| 2015/0268932 A1* | 9/2015 | Reblitz-Richardson | G06F 3/04842 707/752 |

FOREIGN PATENT DOCUMENTS

| | | |
|---|---|---|
| JP | 2006146729 A | 6/2006 |
| WO | WO0210878 | 2/2002 |
| WO | WO2005086029 A1 | 9/2005 |
| WO | WO2007097526 | 8/2007 |
| WO | WO2009074494 | 6/2009 |
| WO | WO2010143839 | 12/2010 |
| WO | WO2014041929 A1 | 3/2014 |

* cited by examiner

METHOD AND APPARATUS FOR SEARCH QUERY FORMULATION

CROSS REFERENCE

This application claims the benefit, under 35 U.S.C. § 365 of International Application PCT/US2015/051421, filed Sep. 22, 2015, which was Published in accordance with PCT Article 21(2) on Mar. 31, 2016 in English and which claims the benefit of U.S. Provisional Patent Application No. 62/053,838, filed on Sep. 23, 2014, which is herein incorporated by reference in its entirety.

TECHNICAL FIELD

The present disclosure generally relates to user interfaces and, more particularly, to user interfaces, systems, and methods for search query formulation based on user selection of portions of graphical representations of media.

BACKGROUND OF THE DISCLOSURE

In systems that present media selections to a user such as audio, video, games, books, movies, and the like, the selection of a particular media item for presentation to the user is often awkward. User interfaces for searching media assets are currently limited to the entry of text by the user or worse; the selection of individual letters that form part of the title of a media asset. Such interfaces are irritating to the user because of their slow and restricted style of query generation. An easier method of generating a search query is sought that makes it easier to construct a query tailored to a user's interest.

SUMMARY OF THE DISCLOSURE

Systems, methods, and user interfaces are provided for search query formulation. A graphical representation of a media item that includes at least one metadata region representing metadata associated with the media item may be provided on a graphical user interface. Then, at least one user selection of at least a portion of the graphical representation of the media item may be received. Based on the relationship between the received selection(s) and the metadata region(s), at least one appropriate metadata search term may be generated. Each search term may be provided to an engine for generating one or more recommendations for other media items. Each recommendation may then be provided on the graphical user interface. In some embodiments, a selection may be defined by overlapping at least a portion of a graphical representation of a first media item with at least a portion of a graphical representation of a second media item.

This summary is provided merely to summarize some example embodiments, so as to provide a basic understanding of some aspects of the subject matter described in this document. Accordingly, it will be appreciated that the features described in this summary are merely examples and should not be construed to narrow the scope or spirit of the subject matter described herein in any way. Other features, aspects, and advantages of the subject matter described herein will become apparent from the following detailed description, drawings, and claims.

BRIEF DESCRIPTION OF THE DRAWINGS

The foregoing summary, as well as the following detailed description, may be better understood when read in conjunction with the accompanying drawings, which are included by way of example and not by way of limitation. The detailed description below makes reference to the following drawings, in which like reference characters may refer to like parts throughout, and in which.

DETAILED DESCRIPTION OF THE DISCLOSURE

Figure 1:
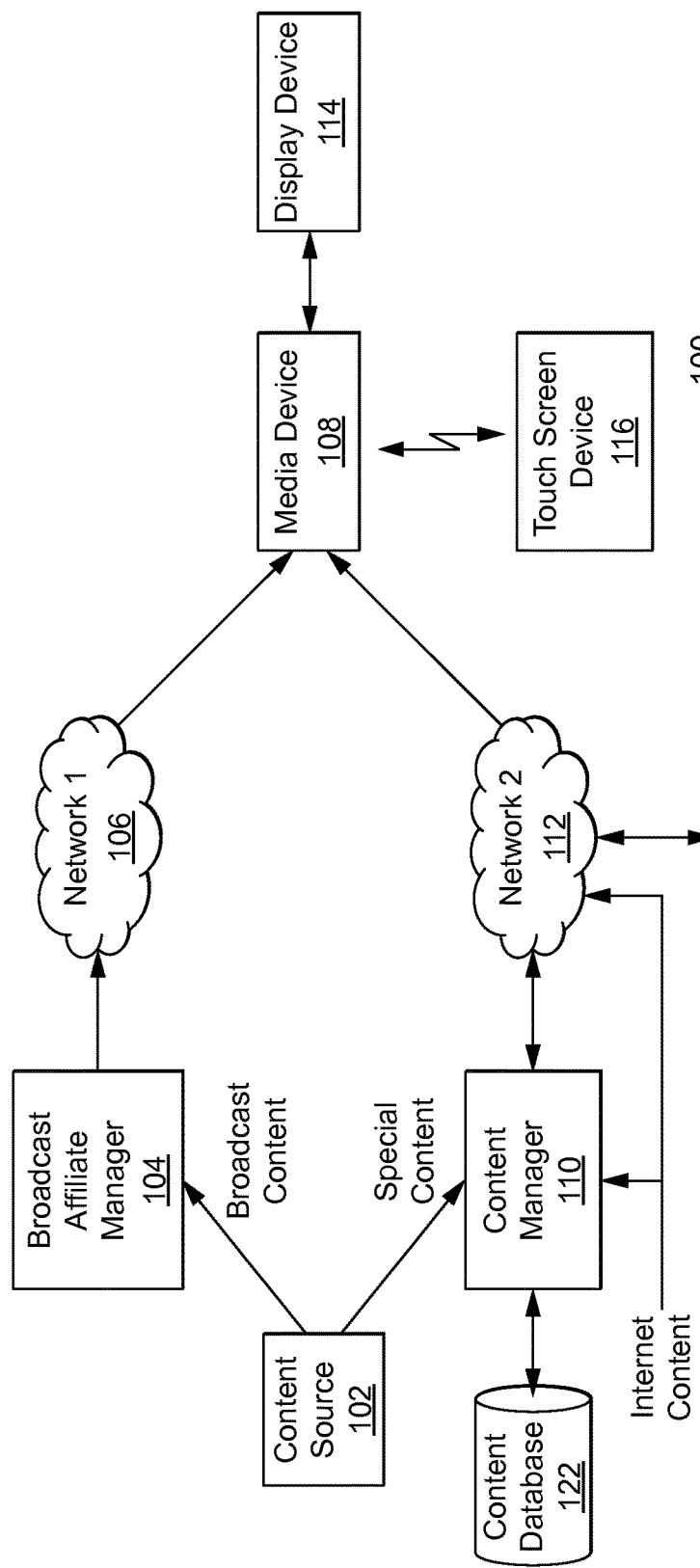
FIG. 1 is an exemplary system block diagram of an exemplary system for search query formulation.

In the following description of various illustrative embodiments, reference is made to the accompanying drawings, which form a part thereof, and in which is shown, by way of illustration, how various embodiments may be practiced. It is to be understood that other embodiments may be utilized and structural and functional modification may be made without departing from the spirit and scope of the disclosure. Therefore, it will be appreciated that those skilled in the art will be able to devise various arrangements that, although not explicitly described or shown herein, embody the principles of the disclosure and are included within its spirit and scope.

All examples and conditional language recited herein are intended for instructional purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future (e.g., any elements developed that perform the same function, regardless of structure).

It should be understood that the elements shown in the drawings may be implemented in various forms of hardware, software, or combinations thereof. Preferably, these elements may be implemented in a combination of hardware and software on one or more appropriately programmed general-purpose devices, which may include a processor, memory, and input/output interfaces. Herein, the phrase "coupled" is defined to mean directly connected to or indirectly connected with through one or more intermediate components. Such intermediate components may include both hardware and software based components.

As will be appreciated by one skilled in the art, aspects of the present disclosure can be embodied as a system, method, or computer readable medium. Accordingly, aspects of the present disclosure can take the form of an entirely hardware embodiment, an entirely software embodiment (e.g., including firmware, resident software, micro-code, and so forth), or an embodiment combining software and hardware aspects that can all generally be referred to herein as a "circuit," "module," or "system." Furthermore, aspects of the present disclosure can take the form of a computer readable storage medium. Any combination of one or more computer readable storage medium(s) may be utilized.

A computer readable storage medium can take the form of a computer readable program product that may be embodied in one or more computer readable medium(s) and that may have computer readable program code embodied thereon that may be executable by a computer. A computer readable storage medium as used herein may be considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present disclosure can be applied, is merely an illustrative and not exhaustive listing as is readily appreciated by one of ordinary skill in the art: a portable computer diskette; a hard disk; a read-only memory ("ROM"); an erasable programmable read-only memory ("EPROM" or Flash memory); a portable compact disc read-only memory ("CD-ROM"); an optical storage device; a magnetic storage device; or any suitable combination of the foregoing.

Thus, for example, it will be appreciated by those skilled in the art that the block diagrams presented herein may represent conceptual views of illustrative system components and/or circuitry that may embody the principles of the disclosure. Similarly, it will be appreciated that any flowcharts, flow diagrams, state transition diagrams, pseudo code, and the like may represent various processes that may be substantially represented in computer readable media and so executed by a computer or processor, whether or not such computer or processor is explicitly shown.

The functions of the various elements shown in the drawings may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the drawings are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, (a) a combination of circuit elements that performs that function or (b) software in any form, including, therefore, firmware, microcode, or the like, combined with appropriate circuitry for executing that software to perform the function. The disclosure as defined by such claims resides in the fact that the functionalities provided by the various recited means are combined and brought together in the manner that the claims call for. It is thus regarded that any means that can provide those functionalities are equivalent to those shown herein.

Turning now to FIG. 1, a block diagram of an embodiment of a system 100 for search query formulation and/or for delivering content to a home or end user is shown. The content may originate from a content source 102, such as a movie studio or production house. The content may be supplied in at least one of two forms. One form may be a broadcast form of content. The broadcast content may be provided to a broadcast affiliate manager 104, which may typically be a national broadcast service, such as the American Broadcasting Company ("ABC"), National Broadcasting Company ("NBC"), Columbia Broadcasting System ("CBS"), etc. Broadcast affiliate manager 104 may collect and store the content, and may schedule delivery of the content over a delivery network, shown as delivery network 1 (106). Delivery network 1 (106) may include satellite link transmission from a national center to one or more regional or local centers. Delivery network 1 (106) may also include local content delivery using local delivery systems such as over the air broadcast, satellite broadcast, or cable broadcast. The locally delivered content may be provided to a media device 108 in a user's home, where the content may subsequently be utilized by the user. It is to be appreciated that the media device 108 can take many forms and may be embodied as a set top box, digital video recorder ("DVR"), a gateway, a modem, or any combination thereof. Further, the media device 108 may act as an entry point, or gateway, for a home network system that may include additional devices configured as either client or peer devices in the home network.

A second form of content that may be provided from content source 102 may be referred to as special content. Special content may include content delivered as premium viewing, pay-per-view, or other content otherwise not provided to the broadcast affiliate manager 104 (e.g., movies, video games, or other video elements). In many cases, the special content may be content requested by the user. The special content may be delivered to a content manager 110. The content manager 110 may be a service provider, such as an Internet website, affiliated, for instance, with a content provider, broadcast service, or delivery network service. The content manager 110 may also incorporate Internet content into the delivery system. The content manager 110 may deliver the content to the user's receiving device or media device 108 over a separate delivery network, delivery network 2 (112). Delivery network 2 (112) may include high-speed broadband Internet type communications systems. It is important to note that the content from the broadcast affiliate manager 104 may also be delivered using all or parts of delivery network 2 (112) and content from the content manager 110 may be delivered using all or parts of delivery network 1 (106) (e.g., where interconnections may not be shown in FIG. 1). In addition, the user may also obtain content directly from the Internet via delivery network 2 (112) without necessarily having the content managed by the content manager 110. The content manager 110 may have access to a content database 122, which may serve as a repository, if not simply as an access point, for content available for viewing by media device 108.

Several adaptations for utilizing the separately delivered content may be possible. In one possible approach, the special content may be provided as an augmentation to the broadcast content, providing alternative displays, purchase and merchandising options, enhancement material, and the like. In another embodiment, the special content may completely replace some programming content provided as broadcast content. Finally, the special content may be completely separate from the broadcast content, and may simply be a media alternative that the user may choose to utilize. For instance, the special content may be a library of movies that are not yet available as broadcast content.

The media device 108 may receive different types of content from one or both of delivery network 1 and delivery network 2. The media device 108 may process the content, and may provide a separation of the content based on user preferences and commands. The media device 108 may also include a storage device, such as a hard drive or optical disk drive, for recording and playing back audio and video content. Further details of the operation of the media device 108 and features associated with playing back stored content are described below in relation to FIG. 2. The processed content may be provided to a display device 114. The display device 114 may be a conventional 2-D type display or may alternatively be an advanced 3-D display. The display device 114 can be a full Television device, a monitor, a display built in and/or associated with the media device 108, and/or a gateway that may contain the media device 108.

The media device 108 may also be interfaced to a second screen such as a touch screen control device 116. The touch screen control device 116 may be adapted to provide user control for the media device 108 and/or the display device 114. The touch screen device 116 may also be capable of displaying video content and/or playing audio content. An example touch screen control device 116 can be a remote control, a digital tablet, a cellular telephone, a personal digital assistant, a personal computer, and the like. The video content that may be displayed on the touch screen device 116 can be a representation of graphics or text entries, such as user interface entries (as discussed below), or can be all or a portion of the video and/or audio content that may be delivered to the display device 114. The touch screen control device 116 may interface to media device 108 using any well known signal transmission system, such as infra-red ("IR") or radio frequency ("RF") communications and may include standard protocols such as infra-red data association ("IRDA") standard, Wi-Fi, Bluetooth and the like, or any other proprietary protocols. Operations of touch screen control device 116 will be described in further detail below.

In the example of FIG. 1, system 100 may also include a back end server 118 and a usage database 120. The back end server 118 may include a personalization engine that may analyze the usage habits of a user and may make recommendations based on those usage habits. The usage database 120 is where the usage habits for a user may be stored. In some cases, the usage database 120 may be part of the back end server 118. For example, the back end server 118 (as well as the usage database 120) may be coupled to the system 100 and may be accessed through the delivery network 2 (112). In an alternate embodiment, the usage database 120 and backend server 118 may be embodied in the media device 108. In a further alternate embodiment, the usage database 120 and back end server 118 may be embodied on a local area network to which the media device 108 may be connected.

Figure 2:
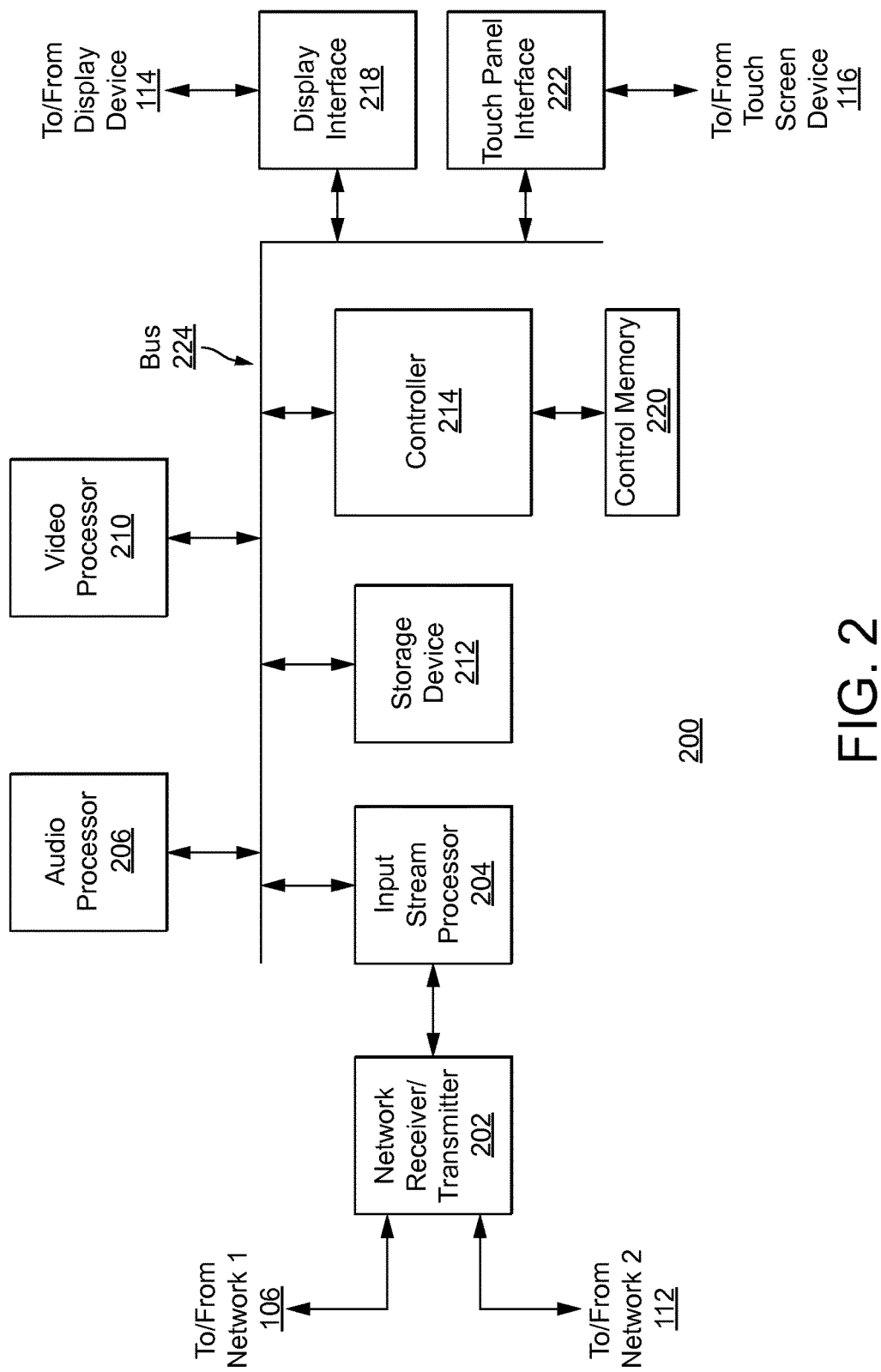
FIG. 2 is an exemplary device block diagram of an exemplary media device of an exemplary system for search query formulation.

Turning now to FIG. 2, a block diagram of an embodiment of a receiving device or a media device 200 is shown. Media device 200 may operate similarly to the media device 108 described in FIG. 1 and may be included as part of a gateway device, modem, set-top box, or other similar communications device. The device 200 shown may also be incorporated into other systems that may include an audio device and/or a display device. In either case, one or more components that may be necessary for complete operation of the system may not be shown in the interest of conciseness, as they are well known to those skilled in the art. In one exemplary embodiment, the media device 200 may be a set-top box coupled to a display device (e.g., a television). In another embodiment, the media device 200 can be a hand-held (e.g., mobile) or fixed location display device that may allow playback of media files.

In the device 200 shown in FIG. 2, the content may be received by network receiver/transmitter 202. The network receiver/transmitter 202 may be one of several known receiver circuits that may be used for receiving, demodulating, and/or decoding signals that may be provided over one of the several possible networks including over the air, cable, satellite, Ethernet, fiber and phone line networks. The desired input signal may be selected and retrieved by the network receiver/transmitter 202 based on user input that may be provided through a control interface or touch panel interface 222 or any other suitable user interface. Touch panel interface 222 may include an interface for a touch screen device. Touch panel interface 222 may also be adapted to interface to a cellular phone, a tablet, a mouse, a high end remote, or the like. In one set of interface embodiments, touch panel interface 222 can be a wired or wireless interface. Wireless interfaces can include any over the air interfaces such as an RF interface and a protocol based interface, such as IEEE 802.11.

In one embodiment, one or more digital busses 224 may interconnect the processor or controller 214 with other functional blocks. One of skill in the art will recognize that non-bus-oriented topologies are also possible implementations of the media device 200. Blocks that have a bus 224 interface with the controller 214 may include input stream processor 204, storage device 212, audio processor 206, video processor 210, display interface 218, and/or touch panel interface 222.

The decoded output signal (e.g., of network receiver/transmitter 202) may be provided to an input stream processor 204. The input stream processor 204 may perform the final signal selection and processing, and may include separation of video content from audio content for the content stream (e.g., of either network input 106 or 112). The audio content may be provided to an audio processor 206 for conversion from the received format, such as a compressed digital signal, to an analog waveform signal or equivalent digital audio for use by an output device, such as an audio component of display device 114 and/or of touch screen device 116 and/or of any other suitable user interface device (e.g., using an audio interface with an audio amplifier, a High-Definition Multimedia Interface ("HDMI") cable or alternate audio interface such as via a Sony/Philips Digital Interconnect Format ("SPDIF"), etc.). The audio interface may also include amplifiers for driving one more sets of speakers. The audio processor 206 may also perform any necessary conversion for the storage of the audio signals. The video output from the input stream processor 204 may be provided to a video processor 210. The video signal may be one of several formats. The video processor 210 may provide, as necessary, a conversion of the video content, based on the input signal format. The video processor 210 may also perform any necessary conversion for the storage of the video signals.

A storage device 212 may store audio and video content received at the input. The storage device 212 may allow later retrieval and playback of the content under the control of a controller 214 and/or based on commands (e.g., navigation instructions such as fast-forward ("FF") and rewind ("RW")), received from a user interface, such as touch panel interface 222. The storage device 212 may be a hard disk drive, one or more large capacity integrated electronic memories, such as static RAM ("SRAM"), or dynamic RAM ("DRAM"), or may be an interchangeable optical disk storage system such as a compact disk ("CD") drive or digital video disk ("DVD") drive.

The converted video signal, from the video processor 210, either originating from the input or from the storage device 212, may be provided to the display interface 218. The display interface 218 may further provide the display signal to a display device of the type described above. The display interface 218 may be an analog signal interface such as red-green-blue ("RGB") or may be a digital interface such as HDMI. It is to be appreciated that the display interface 218 may generate the various screens for presenting graphical representations of media and search results, as described in more detail below with respect to one or more exemplary user interfaces of FIGS. 6 and 7.

The controller 214 may manage the conversion process for converting the input stream signal into a signal for storage on the storage device or for display. The controller 214 may also manage the retrieval and playback of stored content. Furthermore, the controller 214 may perform searching of content stored or to be delivered (e.g., via the delivery networks). In one embodiment, the controller 214 may host a query generator whose function may be to generate a query based on user inputs with respect to one or more media basis graphical representations.

The controller 214 may further be coupled to control memory 220 (e.g., volatile or non-volatile memory, including RAM, SRAM, DRAM, ROM, programmable ROM ("PROM"), flash memory, electronically programmable ROM ("EPROM"), electronically erasable programmable ROM ("EEPROM"), etc.) for storing information and/or instruction code for controller 214 (e.g., for enabling user interaction, receipt of search information, and retrieval of recommendations for presentation, as described herein). Control memory 220 may also store a database of elements, such as graphic elements containing content (e.g., graphic elements relating to media bases and/or metadata regions and/or graphical representations for the generation of a query based on search terms). The database may be stored as a pattern of graphic elements, such as graphic elements containing content, various graphic elements used for generating a displayable user interface for display interface 218, and the like. Alternatively, the memory may store the graphic elements in identified or grouped memory locations and may use an access or location table to identify the memory locations for the various portions of information related to the graphic elements. Additional details related to the storage of the graphic elements will be described below. Further, the implementation of the control memory 220 may include several possible embodiments, such as a single memory device or, alternatively, more than one memory circuit communicatively connected or coupled together to form a shared or common memory. Still further, the memory may be included with other circuitry, such as portions of bus communications circuitry, in a larger circuit.

Optionally, controller 214 can be adapted to extract metadata, criteria, characteristics or the like from audio and/or video media by using audio processor 206 and/or video processor 210, respectively. That is, metadata, criteria, characteristics, or the like that may be contained in the vertical blanking interval, auxiliary data fields associated with video, or in other areas in the video signal can be harvested by using the video processor 210 with controller 214 to generate metadata that can be used for functions such as generating an electronic program guide having descriptive information about received video, supporting an auxiliary information service, supporting a search user interface and recommendation retrieval, and the like. Similarly, the audio processor 206 working with controller 214 can be adapted to recognize audio watermarks that may be in an audio signal. Such audio watermarks can then be used to perform some action such as the recognition of the audio signal, provide security that may identify the source of an audio signal, or perform some other service. Furthermore, metadata, criteria, characteristics, or the like, to support the actions listed above can come from a network source that may be processed by controller 214.

Figure 4:
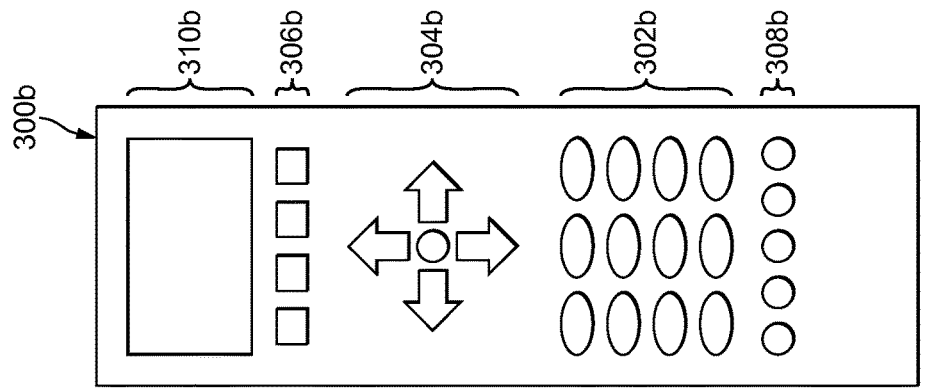
FIG. 4 is a front view of an exemplary media device of an exemplary system for search query formulation.
Figure 3:
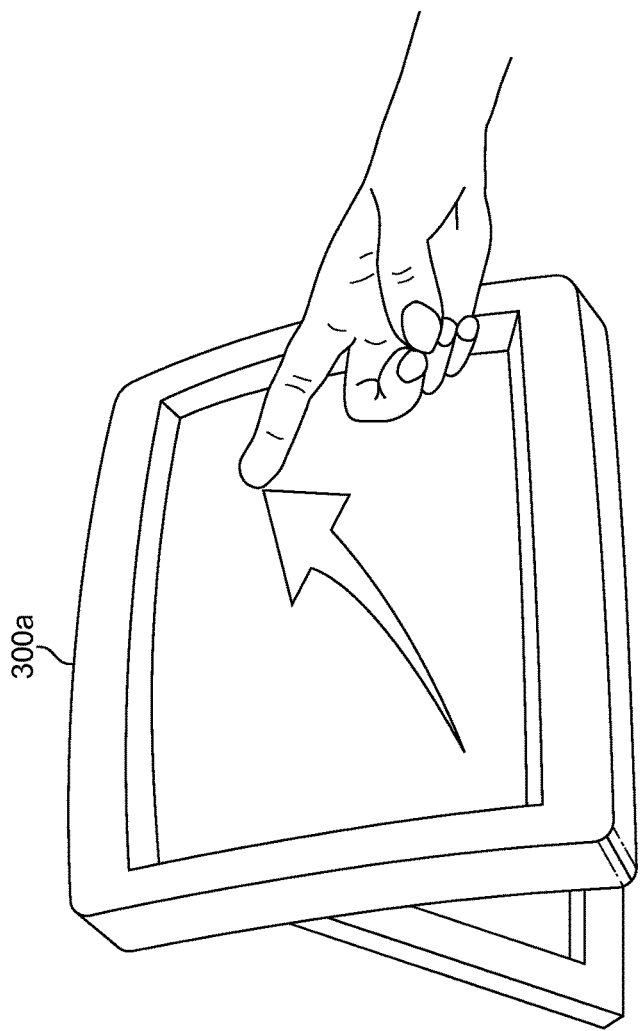
FIG. 3 is a perspective view of an exemplary media device of an exemplary system for search query formulation.

FIGS. 3 and 4 may represent two exemplary input devices, 300a and 300b (hereinafter referred to collectively as I/O or input device 300), for use with the system described in FIGS. 1 and 2. The user input device 300 may enable operation of and/or interaction with the user interface processes according to the disclosure. The input device may be used to initiate and/or enable user selection of any function available to a user related to the acquisition, consumption, access, search, and/or modification of multimedia content. FIG. 3 may represent one exemplary tablet or touch panel input device 300a, which may be the same as the touch screen device 116 shown in FIG. 1 and/or may be an integrated example of media device 108 and touch screen device 116 as a single user media device. The touch panel device 300a may be interfaced via a user interface and/or touch panel interface 222 of the media device 200 in FIG. 2. The touch panel device 300a may allow operation of the media device or set-top box based on hand movements, gestures, touch events, and/or other actions translated through the panel into commands for the set-top box or other control device. This may be achieved by the controller 214 generating a touch screen user interface that may include at least one user selectable image element enabling initiation of at least one operational command. The touch screen user interface may be pushed to the touch screen or touch panel device 300a via the user interface and/or the touch panel interface 222. In an alternative embodiment, the touch screen user interface generated by the controller 214 may be accessible via a webserver executing on one of the user interface and/or the touch panel interface 222. The touch panel 300a may serve as a navigational tool to navigate any user interface. In other embodiments, the touch panel 300a may additionally or alternatively serve as the display device that may allow the user to more directly interact with one or more graphical representations of a user interface display of content (e.g., as display device 114). The touch panel device 300a may be included as part of a remote control device 300b that may contain more conventional control functions, such as an activator and/or actuator buttons, such as is shown in FIG. 4. The touch panel device 300a can also include at least one camera element and/or at least one audio sensing element.

The touch panel 300a may employ a gesture sensing controller or touch screen that may enable a number of different types of user interaction. The inputs from the controller may be used to define gestures and the gestures, in turn, may define specific contextual commands. The configuration of the sensors may permit defining movement of a user's fingers on a touch screen or may even permit defining the movement of the controller itself in either one dimension or two dimensions. Two-dimensional motion, such as a diagonal, and a combination of yaw, pitch, and roll can be used to define any three-dimensional motions (e.g., in free space), such as a swing. Gestures may be interpreted in context and may be identified by defined movements made by the user. Depending on the complexity of the sensor system, only simple one dimensional motions or gestures may be allowed. For instance, a simple right or left movement on the sensor as shown here may produce a fast forward or rewind function or a movement of a graphical representation. In addition, multiple sensors may be included and placed at different locations on the touch screen. For instance, a horizontal sensor for left and right movement may be placed in one spot and used for volume up/down, while a vertical sensor for up and down movement may be placed in a different spot and used for channel up/down. In this way specific gesture mappings may be used. For example, the touch screen device 300a may recognize alphanumeric input traces which may be automatically converted into alphanumeric text displayable on one of the touch screen device 300a or output via display interface 218 to a primary display device (e.g., display device 114).

The system may also be operated using an alternate input device 300b, such as the one shown in FIG. 4. The input device 300b may be used to interact with the user interfaces generated by the system and/or may be output for display by the display interface 218 to a primary display device (e.g., a television, monitor, etc.). The input device of FIG. 4 may be formed as a conventional remote control having a 12-button alphanumerical key pad 302b and/or a navigation section 304b that may include directional navigation buttons and a selector. The input device 300b may also include a set of function buttons 306b that, when selected, may initiate a particular system function (e.g., menu, guide, DVR, etc.). Additionally or alternatively, the input device 300b may include a set of programmable application specific buttons 308b that, when selected, may initiate a particularly defined function associated with a particular application executed by the controller 214 (e.g., a search and/or recommendation function). As discussed above, the input device may also include a touch panel 310b that may operate in a similar manner as discussed above in FIG. 3. The depiction of the input device in FIG. 4 is merely exemplary and the input device may include any number and/or arrangement of buttons or other input components or sensors that may enable a user to interact with the user interface processes described herein. Additionally, it should be noted that users may use either or both of the input devices depicted and described in FIGS. 3 and 4 simultaneously and/or sequentially to interact with the system. In some embodiments, the input devices of FIGS. 3 and 4 may be provided as a single I/O device.

The user input device may include at least one of an audio sensor and a visual sensor. The audio sensor may sense audible commands issued from a user and may translate the audible commands into functions to be executed by the user. The visual sensor may sense the user(s) present and may match user information of the sensed user(s) to stored visual data in the usage database 120 in FIG. 1. Matching visual data sensed by the visual sensor may enable the system to automatically recognize the user(s) present and retrieve any user profile information associated with those user(s). Additionally, the visual sensor may sense physical movements of at least one user present and may translate those movements into control commands for controlling the operation of the system. The system may have a set of pre-stored command gestures that, if sensed, may enable the controller 214 to execute a particular feature or function of the system. An exemplary type of gesture command may include the user waving their hand in a rightward direction that may initiate a fast forward command or a next screen command or a leftward direction that may initiate a rewind or previous screen command depending on the current context. This description of physical gestures able to be recognized by the system is merely exemplary and should not be taken as limiting. Rather, this description is intended to illustrate the general concept of physical gesture control that may be recognized by the system and persons skilled in the art could readily understand that the controller may be programmed to specifically recognize any physical gesture and allow that gesture to be tied to at least one executable function of the system.

In the context of the present system, the input device 300 may enable the user to interact with any suitable type of user interface for enabling media searching and/or media recommendations. In the following description, it should be understood that all user interfaces may be generated by the controller 214 of FIG. 2 and output to the user via at least one of the user interface, the display interface 218, and/or the touch panel interface 222. Additionally, the interaction with the user interfaces generated by the controller 214 may be accomplished via the input device 300a and/or 300b such that any user interactions may be received and processed by the controller 214 resulting in one of (a) updating the currently displayed user interface in response to the user interaction, and (b) generating a new user interface in response to the data selected or entered by the user. Exemplary user interfaces will now be discussed with respect to FIGS. 6 and 7.

Figure 6:
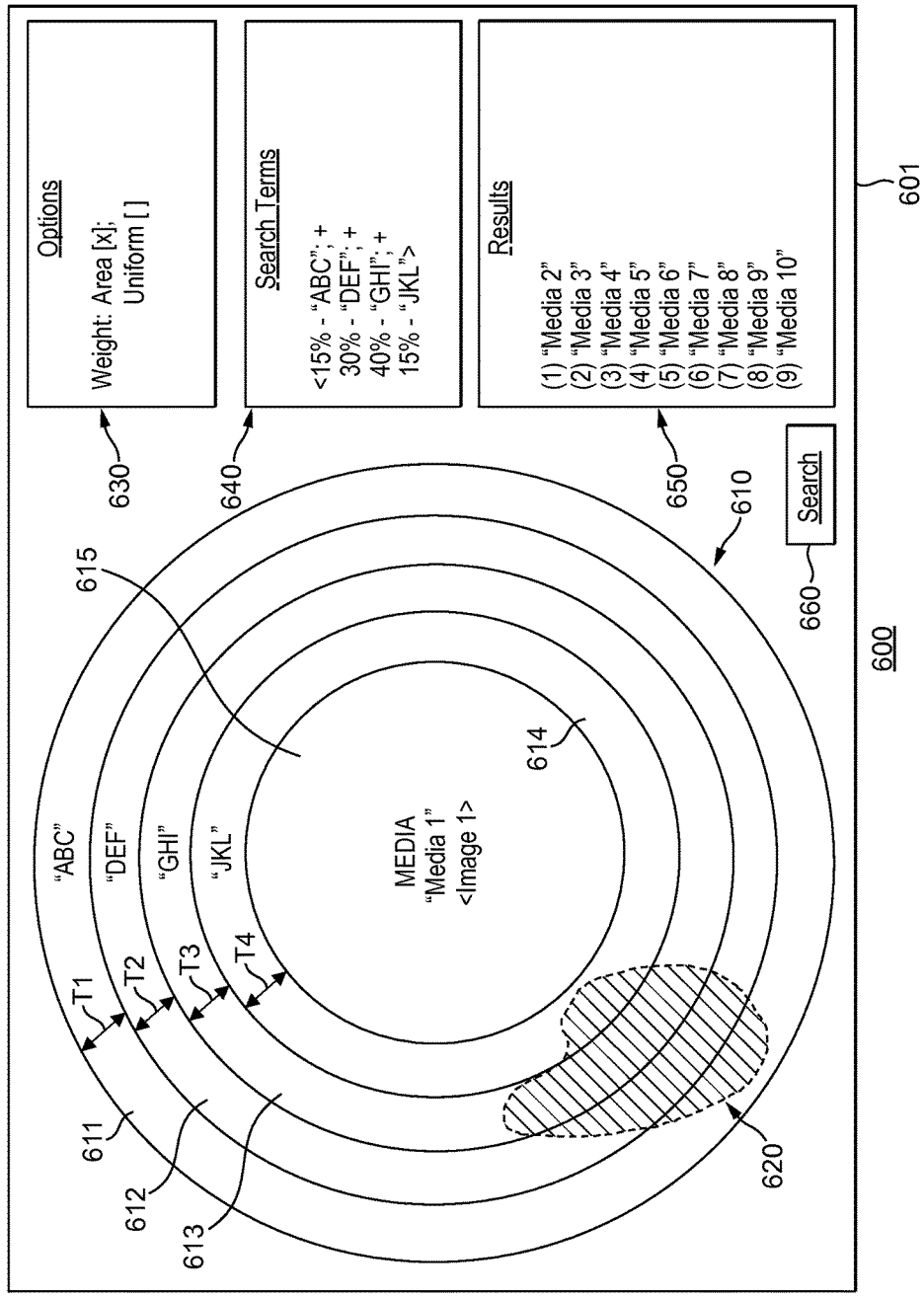
FIGS. 6 and 7 are exemplary user interfaces of an exemplary media device of an exemplary system for search query formulation.

FIG. 6 illustrates one example of a user interface 600 for enabling generation of search terms for providing recommendations to a user. Instead of requiring a user enter textual data via a user interface for generating search terms for a search engine, user interface 600 may enable a user to interact with a graphical representation 610 of at least one media basis (e.g., media 1) for generating one or more search terms to be used by a search engine (e.g., for recommending media items to a user based on the one or more generated search terms). FIG. 6 shows how a user can interact with user interface 600 for generating one or more search terms based on a graphical representation 610 and one or more options enabled by the user interface.

As shown in FIG. 6, user interface 600 may provide a graphical representation 610 of a media basis (e.g., "Media 1") on a display screen 601 (e.g., a display screen of display device 114, touch screen device 116, touch panel 310b, etc.). The media basis may be any suitable type of media asset or media item or other suitable entity that may provide at least a portion of the foundation for a search to be performed by a user. For example, a media basis may be a song, album, artist, actor, director, movie, show, program, video game, app (e.g., mobile application or other suitable computer program), architecture, architects, products (e.g., electronic devices (e.g., telephones, game consoles, graphic cards, etc.,) with product details/specifications as metadata for comparing against competitor brands), food items (e.g., with recipes or ingredients or nutritional information as metadata for comparing against similar foods or supplements), and the like. As described below with respect to FIG. 5, a media item or any other suitable media basis may be associated with one or more pieces of metadata that may be descriptive or otherwise associated with the media item. Graphical representation 610 may include at least one metadata region representative of a particular piece of metadata (e.g., metadata tag) that may be associated with the media basis. As shown in FIG. 6, graphical representation 610 may include four metadata regions (e.g., regions 611-614), each of which may be representative of a respective different metadata associated with media basis Media 1. For example, region 611 may be representative of metadata "ABC," region 612 may be representative of metadata "DEF," region 613 may be representative of metadata "GHI," and region 614 may be representative of metadata "JKL." Graphical representation 610 may also include an indicator region indicative of the media basis represented by graphical representation 610. For example, indicator 615 of graphical representation 610 may identify to a user that graphical representation 610 is indicative of a particular media basis through a textual identifier citing "Media 1," an image identifier <Image 1> that may pictorially identify Media 1 to a user, and/or any other suitable identifier that may convey to a user of user interface 600 that graphical representation 610 is representative of such a media basis. The initial presentation of at least one media basis as graphical representation 610 may be provided (e.g., by system 100) to a user in any suitable way. For example, the user may choose a particular media basis for use in a search process by selecting from a list of suitable media bases, aurally speaking the name of such a media basis, or identifying the media basis in any other suitable way.

As just one example, the media basis represented by graphical representation 610 may be the well-known movie "The Matrix." In such an example, indicator 615 may include a textual identifier as "The Matrix" in place of "Media 1" and/or may include an image representative of that movie (e.g., a JPEG of the movie's theatrical poster) in place of <Image 1>. Following with the example of graphical representation 610 representing the movie "The Matrix," each one of regions 611-614 may be representative of any suitable metadata that may be associated with the media basis "The Matrix." For example, region 611 may be representative of "science fiction movie" metadata and indicator "ABC" of region 611 may be any textual, pictorial, or other suitable type of identifier that may convey to a user of user interface 600 that region 611 is representative of such metadata. As another example, region 612 may be representative of "science fiction and cerebral movie" metadata or just "cerebral movie" metadata and indicator "DEF" of region 612 may be any textual, pictorial, or other suitable type of identifier that may convey to a user of user interface 600 that region 612 is representative of such metadata. As yet another example, region 613 may be representative of "science fiction and cerebral movie with martial arts" metadata or just "movie with martial arts" metadata and indicator "GHI" of region 613 may be any textual, pictorial, or other suitable type of identifier that may convey to a user of user interface 600 that region 613 is representative of such metadata. As yet another example, region 614 may be representative of "Keanu Reeves media" metadata and indicator "JKL" of region 614 may be any textual, pictorial, or other suitable type of identifier that may convey to a user of user interface 600 that region 614 is representative of such metadata. It is to be understood that representation 610 may be representative of any suitable media basis and that each region of representation 610 (e.g., each one of regions 611-614) may be representative of any suitable metadata that may be associated with such a media basis.

Such a graphical representation may have any suitable shape and such regions of the graphical representation may have any suitable relationship with one another and with respect to the overall structure of the graphical representation. One particular example, as shown in FIG. 6, may provide graphical representation 610 as a circular object with indicator region 615 concentrically surrounded by metadata regions 611-614 (e.g., as different orbits or rings at different distances away from and about central indicator region 615). For example, as shown, metadata region 614 may extend about (e.g., concentrically around) indicator region 615 by a thickness T4, metadata region 613 may extend about (e.g., concentrically around) metadata region 614 by a thickness T3, metadata region 612 may extend about (e.g., concentrically around) metadata region 613 by a thickness T2, and metadata region 611 may extend about (e.g., concentrically around) metadata region 612 by a thickness T1. It is to be understood, however, that representation 610 may be provided in any suitable arrangement other than circular with concentric metadata regions. For example, representation 610 may include an indicator region and/or metadata regions of various other shapes, such as triangular, polygonal, star-shaped, and the like, each of which may be concentric with the other, adjacent with one another, or in any other suitable positional relationship. In other embodiments, for example, representation 610 may be provided in a list-like format, where metadata regions may be provided in a linear list (e.g., extending in the direction from the top of screen 601 to the bottom of screen 601, or the like, where indicator region 615 may be anywhere adjacent or amongst the metadata regions.

With continued reference to the exemplary concentric embodiment of FIG. 6, the arrangement of metadata regions within graphical representation 610 may be determined by any suitable metric or combination of metrics. In some embodiments, metadata regions associated with metadata that may be deemed more specific may be provided as smaller and/or as more internal regions than metadata regions associated with metadata that may be deemed more general. For example, continuing with the above example for media basis movie "The Matrix," metadata region 614 representative of "Keanu Reeves media" metadata for a particular actor in the movie may be considered more specific than metadata region 611 representative of "science fiction movie" metadata for the broadest genre of the movie and, therefore, may be provided as a smaller and/or internal region of representation 610. Alternatively, in some embodiments, more specific metadata regions may be initially provided as larger and/or as more external regions than more general metadata regions of representation 610. In yet other embodiments, regions for most commonly associated metadata may be more internal regions while regions for less commonly associated metadata may be more external regions (e.g., if a representation were associated with an artist, the genre most commonly associated with that artist may be represented by the most inner metadata region, while another genre associated with that artist, albeit less commonly, may be represented by an outer metadata region (e.g., "surrealism" vs. "cubist" styles for the artist Man Ray)). In yet other embodiments, regions for more pervasive metadata may be more internal regions while regions for less pervasive metadata may be more external regions (e.g., if a representation were associated with a food item, the most pervasive ingredient of that food item may be represented by the most inner metadata region, while a less pervasive ingredient associated with that food item may be represented by an outer metadata region (e.g., "sugar" vs. "food coloring" ingredients for a cookie food item)).

User interface 600 may be configured to enable a user to alter the position of certain metadata regions with respect to other metadata regions within representation 610. For example, user interface 600 may enable a user to slide, tap, or otherwise interact with representation 610 (e.g., through use of a touchscreen, mouse, or any other suitable user input interface) to switch the position of two or more metadata regions within representation 610. For example, in response to the graphical representation 610 of FIG. 6 being initially provided to a user, the user may switch regions 611 and 614 such that metadata region 614 representative of "Keanu Reeves media" metadata may be positioned as the external ring of representation 610 and such that metadata region 611 representative of "science fiction movie" metadata may be positioned as the internal ring of representation 610 (not shown).

Additionally or alternatively, user interface 600 may be configured to enable a user to alter the relative sizes of certain metadata regions with respect to other metadata regions within representation 610. For example, user interface 600 may enable a user to pinch, pull, drag, or otherwise interact with representation 610 (e.g., through use of a touchscreen, mouse, or any other suitable user input interface) to increase or decrease the size of one metadata region with respect to other metadata regions within representation 610. For example, in response to the graphical representation 610 of FIG. 6 being initially provided to a user (e.g., where each one of thicknesses T1-T4 may be the same size), the user may increase thickness T1 to be twice the size of thickness T2 and/or decrease thickness T3 to be half the size of thickness T4 (not shown). Such variation of the size of different regions may affect the search process as a greater area may now be selected due to more area being presented for a particular region that has been increased in size.

Additionally or alternatively, user interface 600 may be configured to enable a user to add additional metadata regions and/or remove existing metadata regions from representation 610 provided by screen 601. For example, user interface 600 may enable a user to double tap, flick, or otherwise interact with an existing metadata region of representation 610 (e.g., through use of a touchscreen, mouse, or any other suitable user input interface) to remove that region from representation 610. For example, a user may decide that it does not wish for metadata region 614 representative of "Keanu Reeves media" metadata to be included in representation 610 that is to be later used for seeding a search request. As another example, user interface 600 may enable a user to instruct user interface 600 (e.g., through interaction with a drop down menu or aural instructions or any other suitable user input interface) to add to representation 610 a new metadata region indicative of another piece of metadata associated with the media basis (e.g., a new metadata region representative of "Laurence Fishburne media" metadata associated with another actor of the movie). As another example, user interface 600 may enable a user to pinch or pull or zoom in or zoom out or otherwise interact with an existing representation 610 (e.g., through use of a touchscreen, mouse, or any other suitable user input interface) to increase or decrease the granularity of representation 610 for adding more metadata regions and/or removing metadata regions from representation 610.

User interface 600 may enable a user to select one or more portions of one or more metadata regions of representation 610 to seed a search. Once an initial representation 610 of at least one particular media basis has been provided to a user on screen 601, or after a user has interacted with user interface 600 to alter the contents or appearance of such a representation 610, user interface 600 may be configured to enable a user to select one or more portions of one or more metadata regions of representation 610 as one or more interest selections for use in defining one or more search terms for a query to be provided to a search engine. For example, as shown in FIG. 6, user interface 600 may be configured to enable a user to define one or more interest selections 620, each of which may highlight or otherwise select at least one portion of at least one metadata region of representation 610. Although only a single interest selection 620 is shown in FIG. 6, two or more such selections may be defined and provided by a user with respect to representation 610, where each one of such selections may be distinct (e.g., non-overlapping) or at least partially overlapping. In some embodiments, if two selections were to overlap, the area of overlap may be provided double the weight of the areas of non-overlap with respect to how search term(s) associated with that overlap area are weighted during a search. Alternatively, the overlap area may be treated the same as if only one area were covering that region or regions. User interface 600 may enable a user to draw with a finger or stylus or mouse pointer, drag a shape definer, or otherwise interact with representation 610 (e.g., through use of a touchscreen, mouse, or any other suitable user input interface) to define one or more selections 620 that may highlight or indicate or otherwise select at least a portion of one or more metadata regions. For example, as shown, a user may define an interest selection 620 that may highlight a portion of each one of metadata regions 611, 612, 613, and 614 of representation 610. Although, in other embodiments, such an interest selection may designate at least a portion of at least one metadata region but not of all metadata regions of representation 610. Additionally or alternatively, in some embodiments, such an interest selection may designate the entirety of at least one metadata region of representation 610 rather than just a portion of such a region. While interest selection 620 of FIG. 6 may be an irregular shape (e.g., as may be drawn free-hand by a user), selection 620 may be any suitable shape, such as an ellipse, polygon, star, or the like.

As described below in more detail with respect to FIG. 5, when at least one interest selection 620 is defined with respect to a media representation 610, one or more search terms may be defined based on that interest selection. For example, as shown in FIG. 6, user interface 600 may include a search terms field 640, which may be used to provide to a user a list of search terms that has been generated based on the one or more interest selections provided with respect to representation 610. In some embodiments, as may be indicated by a selected "area" weight option provided by an options field 630 of user interface 600, the generated search terms may be weighted based on the portion of the area of the interest selection 620 defined by each of the metadata regions that may be designated by that interest selection 620. For example, as shown by selection 620 on representation 610 as well as by the list of search terms provided by field 640, 15% of the total area of selection 620 may overlap or be defined by "ABC" metadata region 611, 30% of the total area of selection 620 may overlap or be defined by "DEF" metadata region 612, 40% of the total area of selection 620 may overlap or be defined by "GHI" metadata region 613, and 15% of the total area of selection 620 may overlap or be defined by "JKL metadata region 614, which may in turn weight the search terms such that the search query may weight a first metadata search term "ABC" (e.g., "science fiction movie" metadata) as 15% of the overall search query, a second metadata search term "DEF" (e.g., "cerebral movie" metadata) as 30% of the overall search query, a third metadata search term "GHI" (e.g., "movie with martial arts" metadata) as 40% of the overall search query, and a fourth metadata search term "JKL" (e.g., "Keanu Reeves media" metadata) as 15% of the overall search query. The processing to determine such percentages may be handled by any suitable component(s) or subsystem(s) of system 100 or any other suitable system(s) using any suitable techniques. Alternatively, as described below with respect to FIG. 7, rather than by following a selected "area" weight option, a "uniform" weighting scheme may be followed (e.g., selected by a user in field 630 and/or automatically followed by user interface 600), whereby the generated search terms may be weighted equally. For example, under such a uniform weighting scheme, the search query may weight each one of metadata search terms "ABC," "DEF," "GHI," and "JKL" equally as 25% of the overall search query due to the fact that at least a portion of each one of metadata regions 611-614 is indicated by selection 620. Another weighting scheme may consider the relative position of any two or more selected regions (e.g., more inner or more outer regions) and may provide more weight to one relative position over the other (e.g., more weight to an inner region than to an outer region). In other embodiments, the system may be configured to enable a user to adjust the opacity or any other visual characteristic of one or more regions, such that the value of that characteristic may also be considered when weighting search terms of selected regions (e.g., a greater weight for a selected region with a higher opacity than for a selected region with a lower opacity). In other embodiments, the system may be configured to enable a user to spin one or more regions (e.g., about a center axis of representation 610, such as through use of a mouse, hand gesture, swipe, etc.), where the region may spin indefinitely with a speed and direction (e.g., clockwise or counter-clockwise) determined by the user input gesture to initiate the spin, such that the speed and/or direction values of each region may also be considered when weighting search terms of selected regions (e.g., a greater weight for a selected region with a higher spin speed than for a selected region with a lower spin speed or no spin speed at all, and/or a greater weight for a selected region spinning clockwise than for a selected region spinning counterclockwise). For example, a region spinning at a 200% speed in a clockwise direction may be weighted twice as much as a region spinning at a 100% speed in a clockwise direction, which may be weighted twice as much as a region spinning at a 100% speed in a counter-clockwise direction, which may be weighted twice as much as a region spinning at a 200% speed in a counter-clockwise direction, such that both speed and direction may affect a weighting scheme.

Figure 5:
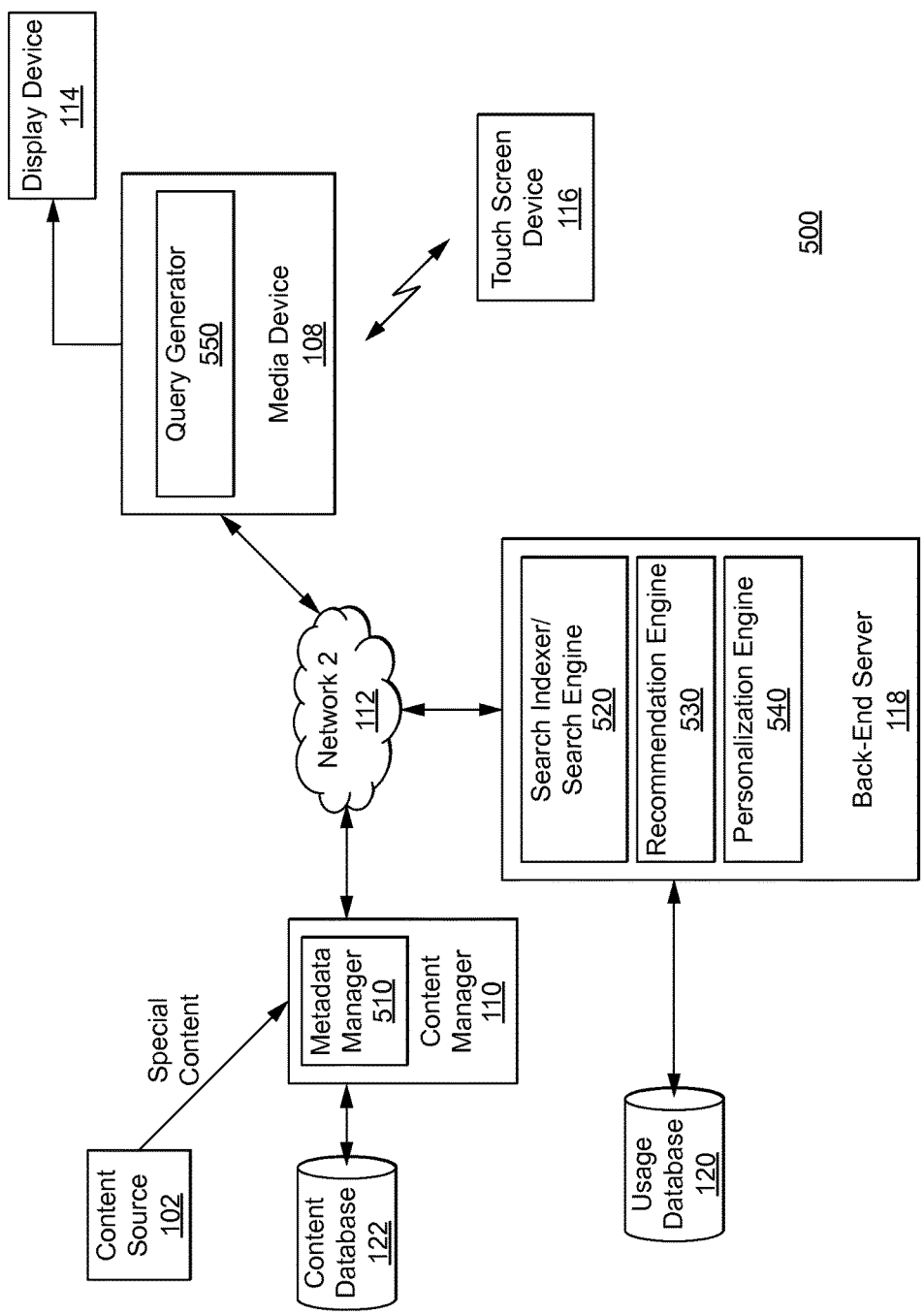
FIG. 5 is an exemplary component block diagram of at least a portion of an exemplary system for search query formulation.

Moreover, as described in more detail with respect to FIG. 5, such search terms, as may be generated based on a user's interaction with representation 610 (e.g., through definition of one or more selections 620), may be provided as input to a search engine/recommendation engine for providing one or more recommendations to a user at least based on such search terms. For example, as shown by results field 650 of user interface 600, one or more recommendation results for one or more other media bases or suitable media items or assets may be provided by interface 600 to a user in response to such search terms being defined by selection 620 (e.g., media assets or media bases 2-10, which may be ordered based on relevance to the search terms used for generating the results). In some embodiments, the results of field 650 may be updated in real-time and/or nearly immediately in response to the current search terms defined by the current selection(s) 620 provided on representation 610. The processing to determine such search terms and such recommendation results may be handled by any suitable component(s) or subsystem(s) of system 100 or any other suitable system(s) using any suitable techniques. Alternatively, such recommendation results may only be processed and provided to a user in response to a user selecting a "search" option 660 of interface 600.

Figure 7:
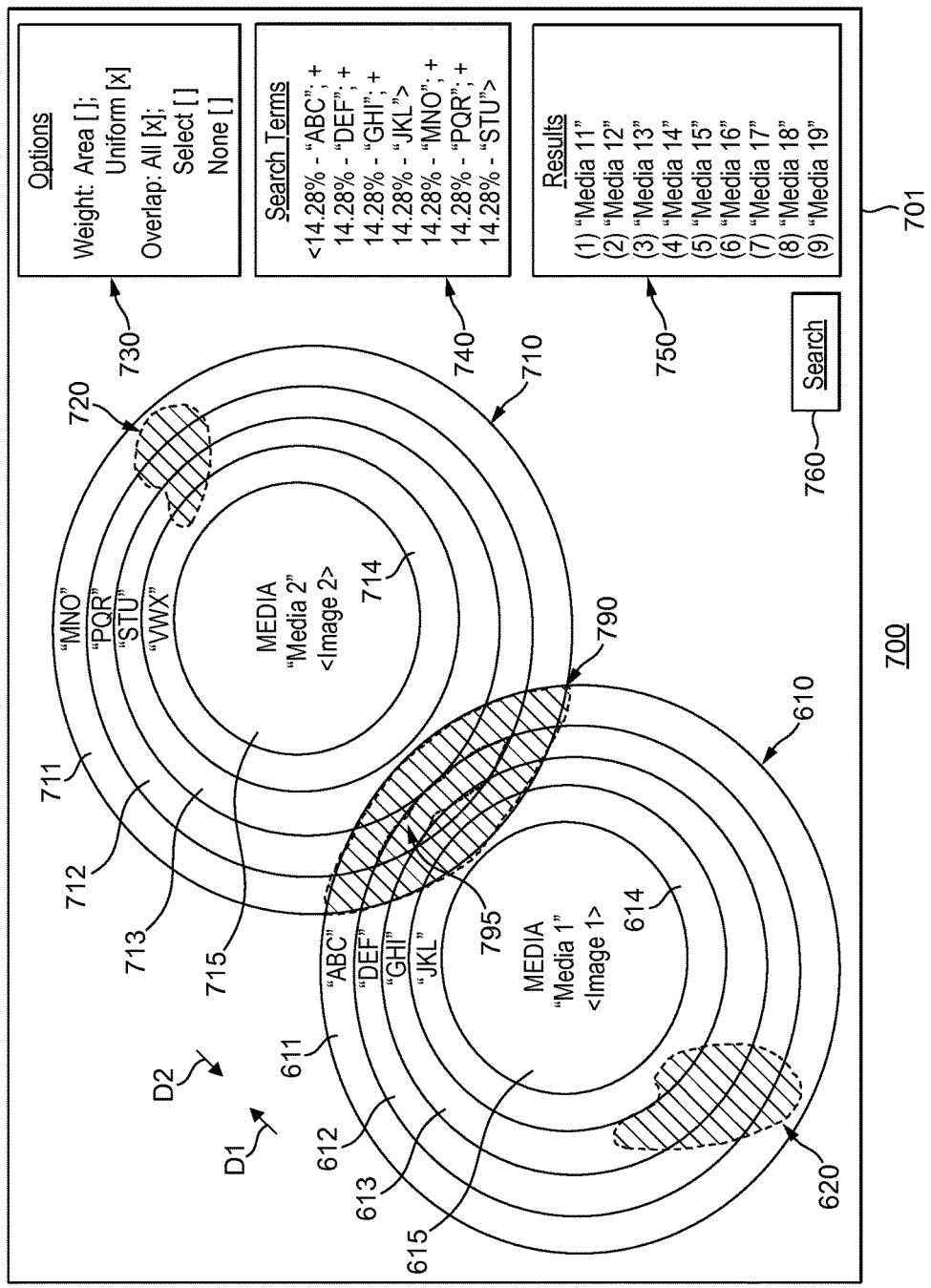

FIG. 7 illustrates another example of a user interface for enabling generation of search terms for providing recommendations to a user. Instead of requiring a user enter textual data via a user interface for generating search terms for a search engine, user interface 700 may enable a user to interact not only with a first graphical representation 610 of a first media basis (e.g., media 1) but also with a second graphical representation 710 of a second media basis (e.g., media 2) for generating one or more search terms to be used by a search engine (e.g., for recommending media items to a user based on the one or more generated search terms). FIG. 7 shows how a user can interact with user interface 700 for generating one or more search terms based on one or more selections made with respect to both graphical representation 610 and graphical representation 700, as well as one or more options enabled by the user interface.

As shown in FIG. 7, user interface 700 may provide graphical representation 610 of a first media basis (e.g., "Media 1"), as described with respect to FIG. 6, as well as graphical representation 710 of a second media basis (e.g., "Media 2") on a display screen 701 (e.g., a display screen of display device 114, touch screen device 116, touch panel 310b, etc.). Each one of the two media bases may be any suitable type of media asset or media item or other suitable entity that may provide at least a portion of the foundation for a search to be performed by a user. For example, a media basis may be a song, album, artist, actor, director, movie, video game, app (e.g., mobile application or other suitable computer program), and the like. Similarly to graphical representation 610, graphical representation 710 may include at least one metadata region representative of a particular piece of metadata that may be associated with the media basis. As shown in FIG. 7, graphical representation 710 may include at four metadata regions (e.g., regions 711-714), each of which may be representative of a respective different metadata associated with media basis Media 2. For example, region 711 may be representative of metadata "MON," region 712 may be representative of metadata "PQR," region 713 may be representative of metadata "STU," and region 714 may be representative of metadata "VWX." Graphical representation 710 may also include an indicator region indicative of the media basis represented by graphical representation 710. For example, indicator 715 of graphical representation 710 may identify to a user that graphical representation 710 is indicative of a particular media basis through a textual identifier citing "Media 2," an image identifier <Image 2> that may pictorially identify Media 2 to a user, and/or any other suitable identifier that may convey to a user of user interface 700 that graphical representation 710 is representative of such a media basis. The initial presentation of at least media basis 1 as graphical representation 610 and media basis 2 as graphical representation 710 on user interface 700 may be provided (e.g., by system 100) to a user in any suitable way. For example, the user may choose each of the particular media bases for use in a search process by selecting them from a list of suitable media bases, aurally speaking the names of such media bases, or identifying the media bases in any other suitable way. In one particular example, the user may select result 1 (i.e., "Media 2") from results field 650 to be added to a search user interface 700 along with the initial media basis of media 1.

As just one example, the media basis represented by graphical representation 610 may be the well-known movie "The Matrix," as described above, while the media basis represented by graphical representation 710 may be the well-known movie "The Fast and The Furious," or may be the well-known director "Steven Spielberg." Therefore, graphical representation 610 may represent a movie media basis while graphical representation 710 may represent another movie media basis or a media basis of another type, such as a director media basis, an actor media basis, a genre media basis, or the like, such that the two representations may represent two different types of media bases on the same user interface for a single search process. In such an example, where graphical representation 710 may be the well-known director "Steven Spielberg," indicator 715 may include a textual identifier as "Steven Spielberg" in place of "Media 2" and/or may include an image representative of that director (e.g., a JPEG of the director's head shot) in place of <Image 2>. Following with the example of graphical representation 710 representing the director "Steven Spielberg," each one of regions 711-714 may be representative of any suitable metadata that may be associated with the media basis "Steven Spielberg." For example, region 711 may be representative of "1980's teenage science fiction movies" metadata and indicator "MNO" of region 711 may be any textual, pictorial, or other suitable type of identifier that may convey to a user of user interface 700 that region 711 is representative of such metadata. As another example, region 712 may be representative of "'Jurassic Park' movie" metadata and indicator "PQR" of region 712 may be any textual, pictorial, or other suitable type of identifier that may convey to a user of user interface 700 that region 712 is representative of such metadata. As yet another example, region 713 may be representative of "'Steven Spielberg Productions' media" metadata and indicator "STU" of region 713 may be any textual, pictorial, or other suitable type of identifier that may convey to a user of user interface 700 that region 713 is representative of such metadata. As yet another example, region 714 may be representative of "'Steven Spielberg Video Games' media" metadata and indicator "VWX" of region 714 may be any textual, pictorial, or other suitable type of identifier that may convey to a user of user interface 700 that region 714 is representative of such metadata. It is to be understood that representation 710 may be representative of any suitable media basis and that each region of representation 710 (e.g., each one of regions 711-714) may be representative of any suitable metadata that may be associated with such a media basis. Like representation 610, representation 710 may have any suitable shape and its metadata regions may have any suitable relationship with one another and with respect to the overall structure of the graphical representation. Moreover, as described above with respect to representation 610, the sizes, positions, and amount of various metadata regions of representation 710 may be manipulated by a user of interface 700. Moreover, user interface 700 may be configured to enable a user to alter the relative size of representation 710 with respect to representation 610 within user interface 700. For example, user interface 700 may enable a user to pinch, pull, drag, or otherwise interact with one or both of representations 610 and 710 (e.g., through use of a touchscreen, mouse, or any other suitable user input interface) to increase or decrease the size of one of graphical representation 610 and 710 with respect to the other graphical representation. For example, in response to the graphical representations 610 and 710 of interface 700 being initially provided to a user with the same overall size (e.g., as shown in FIG. 7), the user may increase or decrease the overall size of one of the representations with respect to the other representation (not shown).

As described above with respect to user interface 600 of FIG. 6, user interface 700 may enable a user to select one or more portions of one or more metadata regions of representation 610 and/or of representation 710 to seed a search. For example, in one embodiment, a user may define a first interest selection 620 with respect to first graphical representation 610, as described above with respect to FIG. 6, as well as a second interest selection 720 with respect to second graphical representation 710. Although not shown in search terms field 740 of user interface 700, such a combination of interest selections 710 and 720 may produce a "uniform" weighted search query that may weight each one of metadata search terms "ABC," "DEF," "GHI," "JKL," "MNO," "PQR," "STU," "VWX" equally as 12.5% of the overall search query due to the fact that at least a portion of each one of metadata regions 611-614 is indicated by selection 620 and at least a portion of each one of metadata regions 711-714 is indicated by selection 720. Alternatively, although not shown, a user may define a single interest selection that may cover not only a portion of at least one metadata region of representation 610 but also a portion of at least one metadata region of representation 710, even when representations 610 and 710 do not abut or overlap visually on screen 701.

Additionally or alternatively, as shown in FIG. 7, user interface 700 may be configured to enable a user to move representation 610 and 710 with respect to one another on screen 701 such that at least one portion of at least one metadata region of representation 610 may overlap with at least one portion of at least one metadata region of representation 710. For example, user interface 700 may enable a user to drag, flick, or otherwise interact with representation 610 and/or representation 710 (e.g., through use of a touchscreen, mouse, or any other suitable user input interface) to cause the two representations to overlap. For example, a user may move representation 610 in the direction of arrow D1 and/or representation 710 in the direction of arrow D2 such that representations 610 and 710 overlap to define overlap interest selection 790. Although only two representations of two media bases are shown by user interface 700, any other suitable number of representations of media bases may be provided on a single user interface and a user may define any suitable number of interest selections with respect to those representations, including one or more overlap interest selections (e.g., selection 790) that may overlap two or more representations and/or one or more interest selections that may cover at least a portion of one or more representations (e.g., selection 620 and/or selection 720). A user may define all three of selections 620, 720, and 790 of user interface 700 but may toggle one or more of them on or off in any suitable manner (e.g., through interacting with one or more toggle interface switches or buttons of a media device or otherwise (not shown) to alter which of the selections may be leveraged to define the one or more search terms that may be used to feed a search engine for recommending one or more results to the user.

In some embodiments, as may be indicated by a selected "all" overlap option provided by an options field 730 of user interface 700, and where neither selections 620 or 720 are to be considered (e.g., have been toggled "OFF"), the generated search terms may be determined based on the entire overlap between two or more representations (e.g., by the entire overlap defined by selection 790 of interface 700) and based on a "uniform" weighting option. For example, as shown by selection 790 on representations 610 and 710 as well as by the list of search terms provided by field 740, under such a uniform weighting scheme for an "all" overlap option, the search query may weight each one of metadata search terms "ABC," "DEF," "GHI," "JKL," "MNO," "PQR," and "STU" equally as ~14.28% (e.g., 100% divided by 7) of the overall search query due to the fact that at least a portion of each one of metadata regions 611-614 and regions 711-713 but not region 714 is indicated by selection 790. In other embodiments, although not shown by options field 730 or search terms field 740, the overlapping selection 790 may be weighted using the "area" option such that, as shown by selection 790 on representations 610 and 710, certain percentages of the total area of selection 790 may be defined by each one of metadata regions 611-614 and metadata regions 711-713, which may in turn weight the search terms such that the search query may weight different metadata search terms "ABC," "DEF," "GHI," "JKL," "MNO," "PQR," and "STU" by those certain percentages of the overall search query.

Alternatively, interface 700 may be configured to enable a user to click or otherwise interact with overall selection 790 (e.g., through use of a touchscreen, mouse, or any other suitable user input interface) for selecting one or more certain overlapping portions of an overlapping selection 790 (e.g., overlapping portion selection 795 of overall overlapping section 790, which may be indicative of only the portion of overall overlapping section 790 in which metadata region 612 of representation 610 overlaps metadata region 712 of representation 710). This may enable a user to select one or more portions or segments (e.g., overlapping portion selection 795) of an overall overlapping selection for use as a selector for search terms of a current search (e.g., as may be enabled by a "select" overlap option of options field 730, while a "none" overlap option of options field 730 may disregard any overlap selections and may leverage any other known selections, such as selections 620 and/or 720). As described in more detail with respect to FIG. 5, such search terms, as may be generated based on a user's interaction with representations 610 and 710 (e.g., through definition of one or more selections 620, 720, 790, 795, etc.), may be provided as input to a search engine/recommendation engine for providing one or more recommendations to a user at least based on such search terms. For example, as shown by results field 750 of user interface 700, one or more recommendation results for one or more other media bases or suitable media items or assets may be provided by interface 700 to a user in response to such search terms being defined by the particular selection(s) (e.g., media assets or media bases 11-19, which may be ordered based on relevance to the search terms used for generating the results). In some embodiments, the results of field 750 may be updated in real-time and/or nearly immediately in response to the current search terms defined by the current selection(s) provided on representations 610 and/or 710. The processing to determine such search terms and such recommendation results may be handled by any suitable component(s) or subsystem(s) of system 100 or any other suitable system(s) using any suitable techniques. Alternatively, such recommendation results may only be processed and provided to a user in response to a user selecting a "search" option 760 of interface 700.

Therefore, using one of user interfaces 600 and 700 of FIGS. 6 and 7, a user may generate one or more selections that may identify at least a portion of at least one metadata region of at least one graphical representation of at least one media basis for defining one or more search terms that may be used for a search query for informing one or more recommendation results. Typically, the results (e.g., of results field 650 or 750) may be a simple ordered list. In other embodiments, the results may be displayed as icons or hyperlinks and the like that may enable a user to select a media asset or media basis represented by the result. It should be noted that user interface 600 or 700 can be used to search for any media asset or basis that is searchable. For example, the media assets can be movies, TV shows, public videos, such as YouTube™, music and other types of audio recordings, games, books, magazines, and any other form of audio or video files, actors, directors, characters, producers, genres, or any other suitable concept that may have metadata associated therewith.

One feature of the construction of a query using interface 600 or 700 is the ability of a user to weight the search elements to affect the importance and resulting weight applied to search terms based on the relative size of each portion of each metadata region indicated by a selection. Not only is the user able to overlap certain metadata criteria but there is also the ability for the user to exclude specific metadata criteria by not selecting one or more metadata regions of a media basis graphical representation or, for example, by reducing a region's opacity to 0%, while reducing a region's opacity to slightly above 0% may enable the region to have a minimal amount of weight when a portion of its area is selected. Generally, as shown in search terms fields 640/740 by a "+" symbol, each search term is linked by an AND operator. However, any other Boolean operator, such as OR and NOT, may also be explicitly used.

Turning now again to FIG. 5, a closer look at the component elements 500 of the lower half of FIG. 1 is provided. Here, the example distribution network 2 (112) is depicted along with interconnected functional components. As in FIG. 1, a content source 102 delivers special content, such as movies, film clips, short videos, games, and the like to a content manager 110. Such special content may be made available to the content manager 110 via a content database 122. Content requested by the media device 108 can be delivered to the media device 108 via network 2 (112).

The content source 102 can provide information about the content from the content owners. For example, if the media article provided by the content owner is a movie, a synopsis of the movie may be provided. This synopsis information may form a part of data associated with the media article and/or may be part of the metadata concerning the media article. This and other metadata may be received by the content source 102 and may be processed by the metadata manager 510 that may be residing in the content manager 110. The metadata manager 510 may analyze the metadata concerning the media item or media article, such as a movie, video, audio file, book, or other digital asset and may associate the metadata with the media article. The metadata may contain a title, production date, authors, actors, directors, musicians, production studio, genre, description, search keywords, and the like. The metadata manager 510 may capture the metadata, sort it, and/or associate the metadata with the media article that is made available via the content database 122. The content database may contain the media article and may also contain the related metadata. The content database may be loaded/maintained/updated via a communication from the content owners via the content source 102.

A search indexer and search engine 520 may be part of the back-end server 118. The search indexer may use the metadata from the metadata manager 510 and may provide a searchable organization of the metadata. Such an organization of metadata can be called indexing. The metadata indexing may be useful by a search engine 520 to implement searches based on metadata. Thus, as search terms based on metadata as described above may be one form of metadata that may be organized by the metadata manager 510 and/or search engine 520, then the search engine 520 can access a reference to the digital content that may contain the respective metadata. As such, the search indexer and search engine may work closely with each other. One of skill in the art will appreciate that these two items can be collocated into a single structure or can be separate structures that are closely bound. Each can have its own processor, memory, software instructions, and input/output structure, or both functions can share the same resources.

The recommendation engine 530 of FIG. 5 may be used in conjunction with the personalization engine 540 to provide recommendations in response to a user query based on information about the user in the usage database 120. The usage database 120 may contain information about the user's habits, preferences, and viewings of media articles. When a query is submitted to the back-end server 118 from a query generator 550 of the media device 108, the personalization engine 540 and/or recommendation engine 530 may function to address user specific information that may be relevant to the search. Query results can thus be generated based on the user's experience and preferences with respect to the media articles. A submitted query may first be addressed by the recommendation engine 530 in conjunction with the search indexer/search engine 520. A plurality of results may be found. However, in a circumstance where there are no results from the search, then the query may be addressed by performing a more personalized search based on information from the personalization engine 540.

In some embodiments, a user entering query information into either display device 114 or touch screen device 116 may interact with a query generator 550. As shown, the query generator may be located in the media device. In an alternative embodiment, the query generator may be provisioned as part of the back-end server 118. However, it will be well understood by those of skill in the art that either the media device 108 location or the back-end server 118 location for the query generator will work well. The query generator 550 may receive element string inputs from user interfaces 600 and/or 700 and may translate the input into ordered keywords that may be needed to form a query (e.g., search term queries of fields 640/740).

The query generator 550 of FIG. 5 may then request personalization information with respect to the ordered search terms from the personalization engine 540 of the back-end server 118. In one embodiment, the query generator may already have relevant personalization information in local memory of the media device 108. In that instance, the local personalization information may be used. However, for a novel query, access to the personalization engine 540 of the back-end server 118 may occur. In some embodiments, one or more portions of back-end server 118 of FIG. 5, such as search indexer/search engine 520, recommendation engine 530, and/or personalization engine 540, may be provided by media device 108 rather than being remote from media device 108 (e.g., via network 2 (112)). Additionally or alternatively, usage database 120, metadata manager 510, and/or content source 102/content database 122 may be provided by media device 108 rather than being remote from media device 108 (e.g., via network 2 (112)).

The personalization engine 540 may provide user-related preferences to the query generator 550 based on search terms presented to the personalization engine 540. The usage database 120 may be accessed to provide the personalization engine 540 with information regarding the user preferences, such as favorite subject matter, genre, age appropriateness, and the like. For example, if the query generator 550 provided a search term of an actor name, the combination of usage database and personalization engine may provide the query generator 550 with information as to the user's preferences with respect to the selected actor in various genres that the user may find of interest. This information may be sent back to the query generator 550 from the personalization engine 540 to inform the query generator 550 of ways to modify the query before submittal to the recommendation engine 530. When the personalization engine 540 may provide user preferences with respect to search terms, then the query generator 550 can construct a final query using not only the search terms generated due to the selections and options provided by the user through interface 600/700, but also by the user preferences derived from the personalization engine 540, which may then be used by the recommendation engine 530 (e.g., in conjunction with the search indexer/search engine 520) for generating results for fields 650/750. The personalization engine may provide some additional weighting information for the search terms the query generator. In one example, a search term "drama movie" from the query generator may be scaled for weighting based on the user's known history of viewing dramas. If the specific user prefers dramas to other genres, the scaling of the weighting factor may be moved higher to indicate a strong user preference for a drama in the final search. Thus, in a query construction where a search term related to "drama movie" is used, it may be weighted not only according to the user selection of user interface 600/700 but also, in some embodiments, the personalization engine 340 can provide additional user information which can scale that weighting based on a profile of the user. In one embodiment, the personality engine provides scaling factors for each search term transmitted to the back-end server 118 from the query generator.

Figure 8:
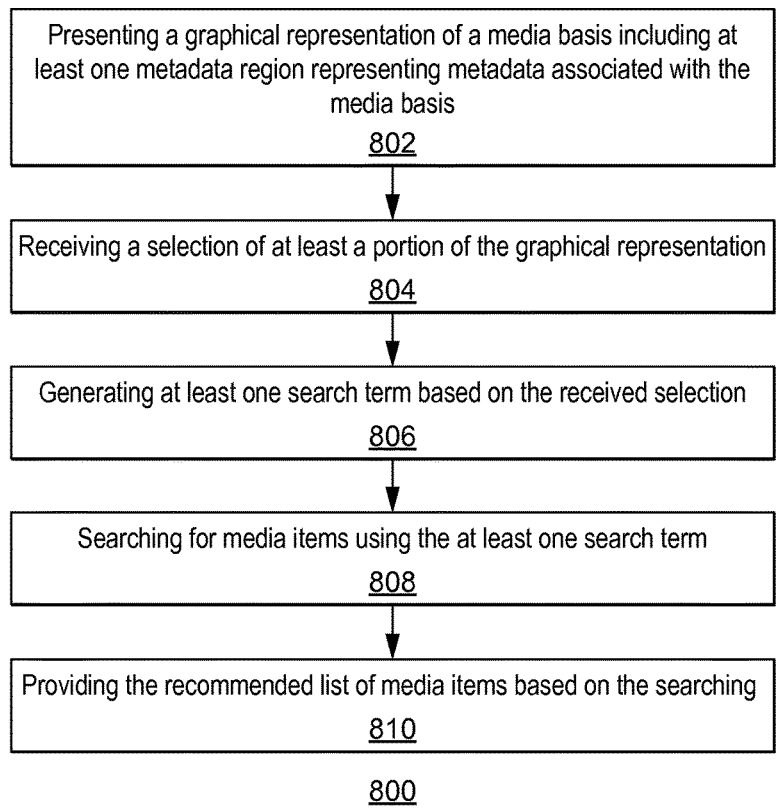
FIGS. 8 and 9 are exemplary flowcharts of exemplary processes for search query formulation.

FIG. 8 is a flowchart of an illustrative process 800 for generating a recommended list of media items. At step 802, process 800 may include presenting a graphical representation of a media basis including at least one metadata region representing metadata associated with the media basis. For example, user interface 600 may be presented to include graphical representation 610 of media basis "Media 1" that may include at least one metadata region 611 representing metadata "ABC" associated with media basis "Media 1." Next, at step 804, process 800 may include receiving a selection of at least a portion of the graphical representation. For example, user interface 600 may receive (e.g., through user interaction) selection 620 of at least a portion of graphical representation 610. Next, at step 806, process 800 may include generating at least one search term based on the received selection. For example, at least one search term may be generated (e.g., as shown in search field 640) based on selection 620, where different search terms may be weighted differently based on the amount of respective metadata regions indicated by the selection. Next, at step 808, process 800 may include searching for media items using the at least one search term. For example, a search engine/recommendation engine of system 500 may search for media items using the search term(s) of search field 640 generated at step 806. Then, at step 810, process 800 may include providing the recommended list of media items based on the searching. For example, a list of media items may be provided in field 650 of interface 600 based on the searching that utilizes the search term(s) of search field 640. A user can then select one of the listed items for viewing or other use on a display device. The presentation of search results can be accomplished via either the display unit 114 or via the touch screen device 116. The results may be presented in weighted order as a list displayed to the user on the media device 108.

It is understood that the steps shown in process 800 of FIG. 8 are merely illustrative and that existing steps may be modified or omitted, additional steps may be added, and the order of certain steps may be altered.

Figure 9:
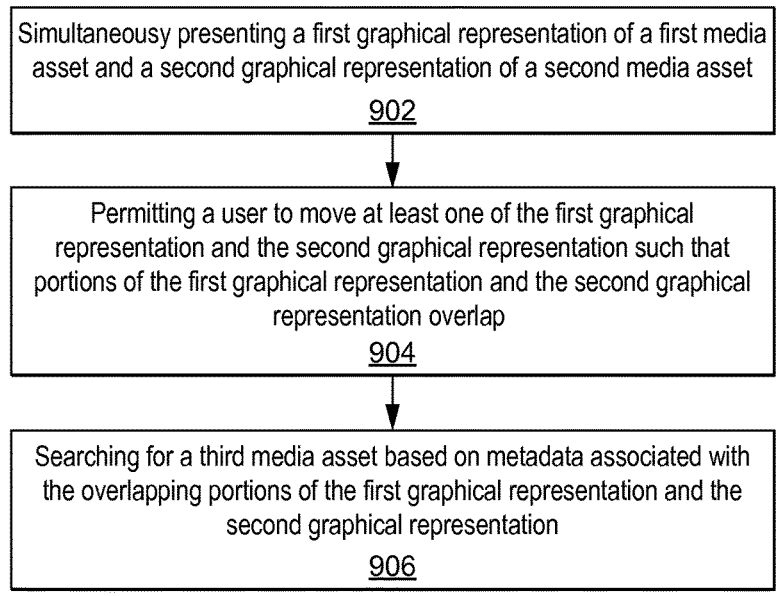

FIG. 9 is a flowchart of an illustrative process 900 for facilitating media asset searches. At step 902, process 900 may include simultaneously presenting a first graphical representation of a first media asset and a second graphical representation of a second media asset, where said first graphical representation may include a first icon representing said first media asset and hierarchical rings surrounding said first icon, where said hierarchical rings may include an inner ring representing specific metadata associated with said first media asset and an outer ring representing generic metadata associated with said first media asset, where said second graphical representation may include a second icon representing said second media asset and hierarchical rings surrounding said second icon, and where said hierarchical rings may include an inner ring representing specific metadata associated with said second media asset and an outer ring representing generic metadata associated with said second media asset. For example, as shown in FIG. 7, user interface 700 may simultaneously present a first graphical representation 610 of a first media asset ("Media 1") and a second graphical representation 710 of a second media asset ("Media 2"), where first graphical representation 610 may include a first icon 615 representing the first media asset ("Media 1") and hierarchical rings 611-614 surrounding first icon 615, where hierarchical rings 611-614 may include an inner ring 614 representing specific metadata ("JKL") associated with the first media asset ("Media 1") and an outer ring 611 representing generic metadata ("ABC") associated with the first media asset ("Media 1"), and a second graphical representation 710 of a second media asset ("Media 2"), where second graphical representation 710 may include a second icon 715 representing the second media asset ("Media 2") and hierarchical rings 711-714 surrounding second icon 715, and where hierarchical rings 711-714 may include an inner ring 714 representing specific metadata ("VWX") associated with the second media asset ("Media 2") and an outer ring 711 representing generic metadata ("MNO") associated with the second media asset. Next, at step 904, process 900 may include permitting a user to move at least one of said first graphical representation of said first media asset and said second graphical representation of said second media asset such that at least a portion of said hierarchical rings of said first graphical representation of said first media asset and at least a portion of said hierarchical rings of said second graphical representation of said second media asset overlap. For example, as shown in FIG. 7, user interface 700 may permit a user to move (e.g., on a touchscreen display 701) at least one of first graphical representation 610 of the first media asset ("Media 1") and second graphical representation 710 of the second media asset ("Media 2") such that at least a portion of hierarchical rings 611-614 of first graphical representation 610 of the first media asset ("Media 1") and at least a portion of hierarchical rings 711-714 of second graphical representation 710 of the second media asset ("Media 2") overlap. Next, at step 906, process 900 may include searching for a third media asset based on metadata associated with the overlapping rings of said first graphical representation of said first media asset and said second graphical representation of said second media asset. For example, as shown in FIGS. 1, 5, and 7, system 100 may search (e.g., with a search engine 520) for a third media asset ("Media 11") (e.g., of results field 750) based on metadata associated with the overlapping rings of first graphical representation 610 of the first media asset ("Media 1") and second graphical representation 710 of the second media asset ("Media 2").

It is understood that the steps shown in process 900 of FIG. 9 are merely illustrative and that existing steps may be modified or omitted, additional steps may be added, and the order of certain steps may be altered.

The implementations described herein may be implemented in, for example, a method or process, an apparatus, or a combination of hardware and software. Even if only discussed in the context of a single form of implementation (e.g., discussed only as a method), the implementation of features discussed may also be implemented in other forms. For example, implementation can be accomplished via a hardware apparatus, hardware and software apparatus, or the like. An apparatus may be implemented in, for example, appropriate hardware, software, and/or firmware. The methods may be implemented in, for example, an apparatus such as, for example, a processor, which may refer to any processing device, including, for example, a computer, a microprocessor, an integrated circuit, or a programmable logic device. Additionally or alternatively, the methods may be implemented by instructions being performed by a processor, and such instructions may be stored on a processor or computer readable media, such as, for example, an integrated circuit, a software carrier or other storage device, such as, for example, a hard disk, a compact diskette ("CD" or "DVD"), RAM, ROM, or any other magnetic, optical, or solid state media. The instructions may form an application program tangibly embodied on a computer readable medium, such as any of the media listed above or known to those of skill in the art.

Although embodiments that incorporate the teachings of the present disclosure have been shown and described in detail herein, those skilled in the art can readily devise many other varied embodiments that still incorporate these teachings. Having described preferred embodiments of a system, method, non-transitory program storage device, and user interface for search query formulation, which are intended to be illustrative and not limiting, it is noted that modifications and variations can be made by persons skilled in the art in light of the above teachings. It is therefore to be understood that changes may be made in the particular embodiments of the disclosure that are within the scope of the disclosure as outlined by the appended claims.

The invention claimed is:

1. A method of generating a recommended list of media items, the method comprising:
   providing a graphical representation of a media basis comprising a plurality of metadata regions, each representing a different media representing metadata associated with the media basis;
   receiving a selection of at least a portion of a graphical representation;

generating at least one search term based on the received selection wherein at least one search term is weighted based on amount of respective metadata regions indicated by the selection;
searching for media items using the at least one search term wherein said search is performed based on the weighting priority given to the metadata regions; and
providing a recommended list of media items in weighted order as a displayable list to the user.

2. The method of claim 1, wherein the graphical representation comprises a plurality of metadata regions;
each metadata region of the plurality of metadata regions represents different metadata associated with the media basis; and
the selection indicates at least a portion of a first metadata region of the plurality of metadata regions.

3. The method of claim 2, wherein the generating comprises:
generating at least a first search term based on the portion of the first metadata region; and
generating at least a second search term based on the portion of the second metadata region.

4. The method of claim 3, further comprising weighting a first search term with respect to a second search term based on the percentage of the selection indicated by the portion of the first metadata region with respect to the percentage of the selection indicated by the portion of a second metadata region.

5. The method of claim 3, wherein the first search term and the second search term are weighted equally in the searching.

6. The method of claim 2, wherein the generating comprises:
presenting a first graphical representation of a first media asset and a second graphical representation of a second media asset and permitting a user to move at least one of the first graphical representation and the second graphical representation such that portions of the first graphical representation and the second graphical representation overlap; and searching for a third media asset based on metadata associated with the overlapping portions of the first graphical representation and the second graphical representation.

7. The method of claim 1, wherein the graphical representation comprises a plurality of metadata regions—;
each metadata region of the plurality of metadata regions—represents different metadata associated with the medial basis; and
after the presenting but prior to the receiving, altering the size of a first metadata region of the plurality of metadata regions with respect to the size of a second metadata region of the plurality of metadata regions.

8. The method of claim 1, wherein:
the graphical representation comprises a plurality of metadata regions; each metadata region of the plurality of metadata regions represents different metadata associated with the medial basis; and
after the presenting but prior to the receiving, altering the position of a first metadata region of the plurality of metadata regions with respect to the size of a second metadata region of the plurality of metadata regions within the graphical representation.

9. The method of claim 1, wherein: the graphical representation comprises a plurality of metadata regions;
each metadata region of the plurality of metadata regions represents different metadata associated with the medial basis; and
after the presenting but prior to the receiving, at least one of removing a first metadata region of the plurality of metadata regions with respect to the size of a second metadata region of the plurality of metadata regions.

10. The method of claim 1, wherein the graphical representation comprises a plurality of metadata regions each metadata region of the plurality of metadata regions represents different metadata associated with the medial basis; and
a first metadata region of the plurality of metadata regions surrounds a second metadata region of the plurality of metadata regions.

11. The method of claim 1, wherein
the presenting further comprises presenting another graphical representation of another media basis comprising at least one metadata region representing metadata associated with the other media basis; and
the receiving comprises receiving at least one selection of at least the portion of the graphical representation and of at least a portion of the other graphical representation.

12. The method of claim 11, wherein the receiving comprises overlapping at least the portion of the graphical representation and at least the portion of the other graphical representation.

13. The method of claim 11, further comprising, after the presenting but prior to the receiving, altering the size of the graphical representation with respect to the size of the other graphical representation.

14. The method of claim 1, wherein the presenting further comprises presenting another graphical representation of another media basis comprising at least one metadata region representing metadata associated with the other media basis; and the receiving comprises receiving at least one selection of at least the portion of the graphical representation and of at least a portion of the other graphical representation.

15. An apparatus comprising:
a user interface that accepts a selection of at least a portion of a graphical representation of a media basis including a plurality of metadata regions, each representing a different media associated with the media basis;
a processor that processes the selection to generate at least one search term based on received selection, where different search terms are weighted differently based on amount of respective metadata regions indicated by said selection, and searches for media items using the at least one search term wherein said search is performed based on the weighting priority given to the metadata regions to generate a recommended list of media items provided in weighted order as a list based on the search term; and
a communication interface that transmits the at least one search term to a search engine.

16. The apparatus of claim 15, wherein the user interface comprises a display of the graphical representation and the selection.

17. The apparatus of claim 15, wherein the user interface comprises a display of the graphical representation and the selection and the user interface reconfigures the graphical representation before the user interface accepts the selection.

18. The apparatus of claim 15, wherein the user interface accepts the selection of at least the portion of the graphical representation of the media basis and of at least a portion of another graphical representation of another media basis.

19. The apparatus of claim 15, wherein the selection comprises an overlap of at least the portion of the graphical representation of the media basis and of at least the portion of the other graphical representation of the other media basis.

\* \* \* \* \*